(12) United States Patent
Qian et al.

(10) Patent No.: US 8,718,474 B2
(45) Date of Patent: May 6, 2014

(54) CHROMATIC DISPERSION COMPENSATION USING SIGN OPERATIONS AND LOOKUP TABLES

(75) Inventors: Dayou Qian, Princeton, NJ (US); Junqiang Hu, Princeton, NJ (US); Ting Wang, Princeton, NJ (US); Yoshiaki Aono, Chiba (JP); Tsutomu Tajima, Chiba (JP)

(73) Assignee: NEC Laboratories America, Inc., Princeton, NJ (US)

( * ) Notice: Subject to any disclaimer, the term of this patent is extended or adjusted under 35 U.S.C. 154(b) by 151 days.

(21) Appl. No.: 13/267,131

(22) Filed: Oct. 6, 2011

(65) Prior Publication Data

US 2012/0301157 A1 Nov. 29, 2012

Related U.S. Application Data

(60) Provisional application No. 61/490,617, filed on May 27, 2011.

(51) Int. Cl.
*H04B 10/00* (2013.01)
*H04J 14/02* (2006.01)
*H04B 10/04* (2011.01)

(52) U.S. Cl.
USPC .............. 398/81; 398/147; 398/159; 398/161

(58) Field of Classification Search
USPC .............. 398/81, 85, 147, 149, 158, 159, 161
See application file for complete search history.

(56) References Cited

U.S. PATENT DOCUMENTS

| | | | | |
|---|---|---|---|---|
| 4,571,719 A * | 2/1986 | Carlqvist et al. | ............... | 370/290 |
| 7,054,281 B2 * | 5/2006 | McNeely | ........................ | 370/316 |
| 7,738,547 B2 * | 6/2010 | Wang et al. | .................... | 375/232 |
| 8,165,214 B2 * | 4/2012 | Iliev | ............................ | 375/240.2 |
| 2004/0215682 A1 * | 10/2004 | Kim | ............................... | 708/300 |
| 2009/0238578 A1 * | 9/2009 | Taylor | ............................ | 398/147 |

* cited by examiner

*Primary Examiner* — Dalzid Singh
(74) *Attorney, Agent, or Firm* — Joseph Kolodka (57) ABSTRACT

Methods and devices for compensating for chromatic dispersion are shown that include receiving an input data signal, applying a filter to the data signal, and outputting a CD compensated signal. Applying the filter includes convolving known filter coefficients with a plurality of delayed versions of the data signal using addition and at least one inverse sign operation or using lookup tables and combining outputs to produce a CD compensated signal.

10 Claims, 10 Drawing Sheets

CHROMATIC DISPERSION COMPENSATION USING SIGN OPERATIONS AND LOOKUP TABLES

RELATED APPLICATION INFORMATION

This application claims priority to provisional application Ser. No. 61/490,617 filed on May 27, 2011, incorporated herein by reference.

BACKGROUND

1. Technical Field

The present invention relates to optical communications and, more particularly, to systems and methods for compensating for chromatic dispersion in optical media.

2. Description of the Related Art

Chromatic dispersion (CD) manifests itself as the wavelength spreading of a pulse of light as it travels over great distances. Optical lasers output pulses of light with a finite spectrum. The longer the fiber over which the pulse travels, the more the pulse spreads out, such that an originally sharp wavelength boundary bleeds into neighboring wavelengths. Difficulties arise when the resulting energy from a pulse begins to interfere with that of an adjacent pulse. This is called inter-symbol interference in the electrical domain. The spreading of symbols across one another causes reception errors, where the receiver side of the link cannot easily distinguish between symbols because they are no longer at ideal levels. Depending on the fiber, pulse spreading may cross several unit intervals. A dispersion of one unit interval means that adjacent symbols within a given symbol will begin to interfere.

CD compensation has been performed optically, electrically, and with digital signal processing. For optical compensation, a dispersion compensating fiber is added in the transmission path. The fiber reverses dispersion, but attenuates the transmission line, such that the signal-to-noise ratio is reduced.

Electrical CD compensation reshapes a received electrical signal in the frequency domain and may use one of a variety of equalizing algorithms such as continuous-time filters, decision feedback equalizing, and maximum likelihood sequence estimation. Electrical CD compensation is limited, however, to compensating over a few unit intervals. As a result, electrical compensation is inadequate for long-distance transmissions.

Digital signal processing has a number of useful properties that overcome the challenges of optical and electrical CD compensation, but it needs considerably more processing power to accomplish. For example, finite impulse response filters used in digital signal processing often need hundreds of taps to effectively compensate for CD, which is not possible for currently available high-speed signal processing chips.

SUMMARY

A method of compensating for chromatic dispersion (CD) is shown that includes receiving an input data signal, applying a filter to the data signal, and outputting a CD compensated signal. Applying the filter includes convolving known filter coefficients with a plurality of delayed versions of the data signal using addition and at least one inverse sign operation and adding the convolved delayed versions of the data signal with at least one adder to produce a CD compensated signal.

A CD compensation device is shown that includes a delay chain comprising a plurality of delay elements configured to receive and delay an input data signal, a plurality of sign/add modules configured to tap a delay element and to convolve a delayed version of the input signal with known filter coefficients using addition and at least one inverse sign operation, and a plurality of adders configured to add the convolved delayed versions of the input signal to produce a CD compensated output data signal.

A method of compensating for chromatic dispersion (CD) is shown that includes receiving an input data signal, applying a filter to the data signal, and outputting a CD compensated signal. Applying the filter includes grouping delayed versions of the data signal into input symbols, determining an output signal symbol using a lookup table that stores associations between input symbols and output symbols based on known filter coefficients, and adding the output symbols with at least one adder to produce a CD compensated signal.

A CD compensation device is shown that includes a delay chain comprising a plurality of delay elements configured to receive and delay an input data signal, a plurality of lookup tables based on known filter coefficients configured to tap a group of delay elements and produce an output symbol, and a plurality of adders configured to add output symbols to produce a CD compensated output data signal.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

No matter what form of chromatic dispersion (CD) compensation digital signal processing (DSP) is used, previous processing functions have run in real-time mode with multiple heavy computing steps. In contrast, the present principles perform CD compensation with a look-up table (LUT) and sign operation instead of, for example, a real-time full finite impulse response (FIR) function. A real-time mode FIR filter can be expressed as the convolution of a coefficient sequence with an input signal. The filter output is a weighted sum of the current value of the input and a finite number of previous values. By using a LUT and sign operation, multiplication between the input signals and the filter coefficients can be accomplished through a quick memory read operation, with or without complex addition functions. LUTs can be generated offline for finite combinations, where such combinations cover all possible input symbol patterns. This greatly reduces the complexity of digital CD compensation.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
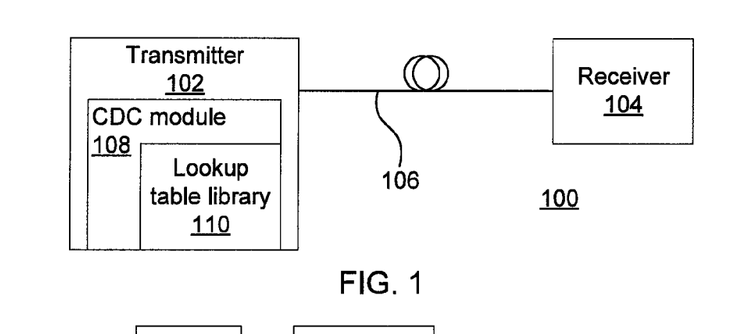
FIG. 1 is a diagram showing an exemplary embodiment of an optical communications system using chromatic dispersion (CD) compensation.

Referring now to the drawings in which like numerals represent the same or similar elements and initially to FIG. 1, an optical communications system is 100 shown that employs CD compensation according to the present principles. Although optical systems are supposed, it should be noted that the same principles may be applied to any transmission incorporating multiple wavelengths over a medium, as any such transmissions will experience wavelength-dependent signal dispersion. A transmitter 102 and a receiver 104 communicate over an optical medium 106 such as an optical fiber. The transmitter is shown as including the CD compensation module 108. Because CD compensation may be considered a linear filter, it can be processed at any point in the system 100. As such, the present principles apply equally to systems having the CDC module implemented in the receiver or, for example, implemented as a separate device along the transmission path. The CD compensation module 108 may optionally include a lookup table library storing a plurality of predefined lookup tables as described below.

There are minor differences between transmitter-side 102 implementations and receiver-side 104 implementations. In the transmitter-side 102, the signal levels are binary outputs which can be represented using a single bit or additional levels, if other modulation schemes are used. In the receiver side 104, the number of bits for each sample will be much larger than the transmitter side 102, due to sampling accuracy needs. However, a lookup table based solution may be applied in both scenarios.

Figure 2:
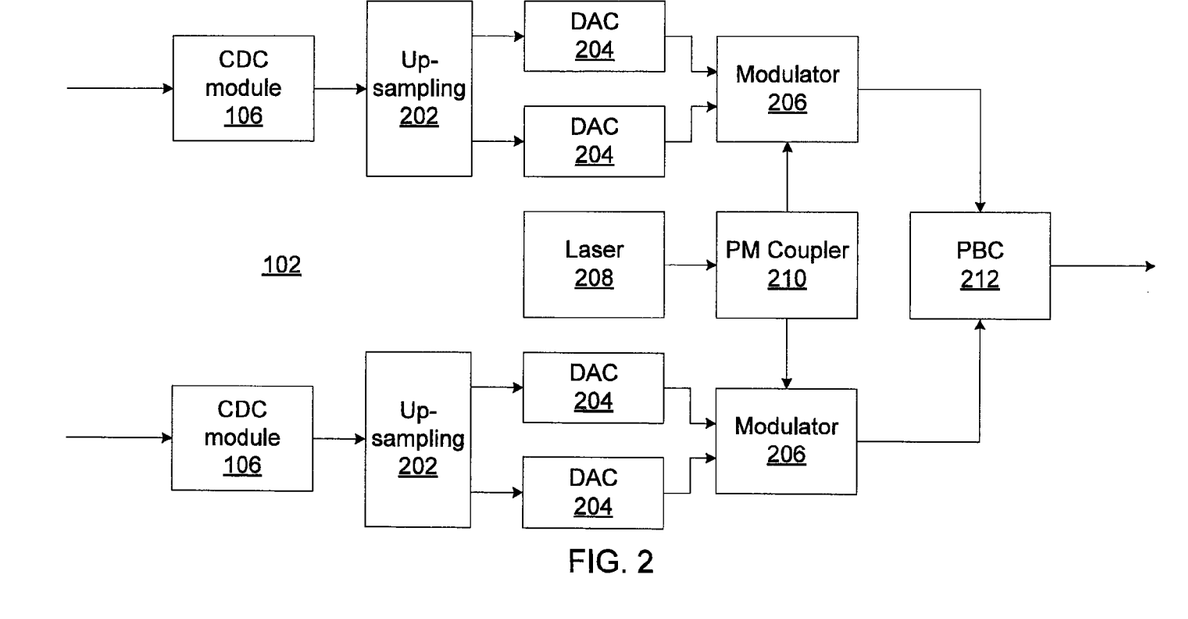
FIG. 2 is a diagram showing an exemplary embodiment of an optical transmitter using CD compensation.

Referring now to FIG. 2, an exemplary transmitter 102 is shown according to the present principles. Input data signals are received by the CD compensation modules 108. Each path represents one polarization channel in the ultimate output carrier beam. As noted above, this linear processing can be done at any point, but for convenience it may be implemented in the electrical domain, before modulation. Digital to analog converters (DACs) 204 are used to convert the CD compensated data signals (representing an in-phase and a quadrature component) to the analog domain, and up-sampling modules 202 increase the sampling rate to match the sampling rate of the DACs 204. For example, the up-sampling modules 202 may increase the sampling rate by a factor of two.

After conversion to the analog domain, the signals pass to modulators 206. A laser 208 provides an unpolarized beam to the polarization-maintaining coupler 208, which splits the beam into two orthogonally polarized beams. The modulators 206 each modulate their respective in-phase and quadrature components onto one of the orthogonal polarizations and pass the resulting modulated beams to polarization beam combiner (PBC) 212. The PBC 212 combines the two polarized beams into one carrier beam and outputs the carrier beam onto the transmission medium 106.

Figure 3:
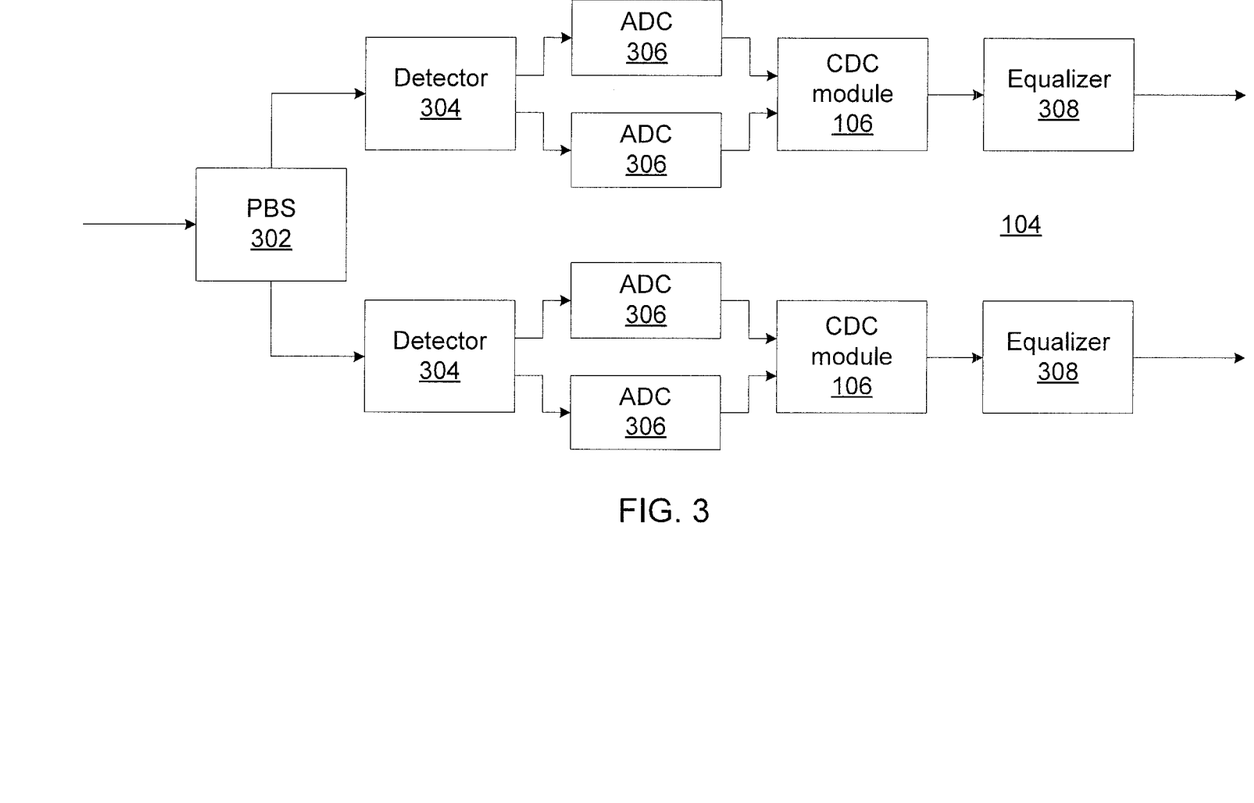
FIG. 3 is a diagram showing an exemplary embodiment of an optical receiver using CD compensation.

Referring now to FIG. 3, an exemplary receiver 104 is shown according to the present principles. As noted above, the placement of the CD compensation module 108 is arbitrary, and so the CD compensation module 108 may just as easily be placed in the receiver. A carrier beam is received from the transmission medium and splits in polarization beam splitter (PBS) 302. The PBS 302 turns the polarization multiplexed carrier beam into orthogonal polarizations and sends the respective polarized beams to detectors 304. The detectors may operate according to any appropriate detection technology including, but not limited to, direct detection and coherent detection. The detectors 304 correct for any polarization mode dispersion that may have taken place during transmission and extract in-phase and quadrature analog data signals. The analog data signals are converted to the digital domain by analog-to-digital converters (ADCs) 306 and then passed to CD compensation module 108. After the CD compensation module 108 has removed chromatic dispersion, equalizers 308 removes any remaining channel impairments. The equalizers 308 output data signals.

Figure 4:
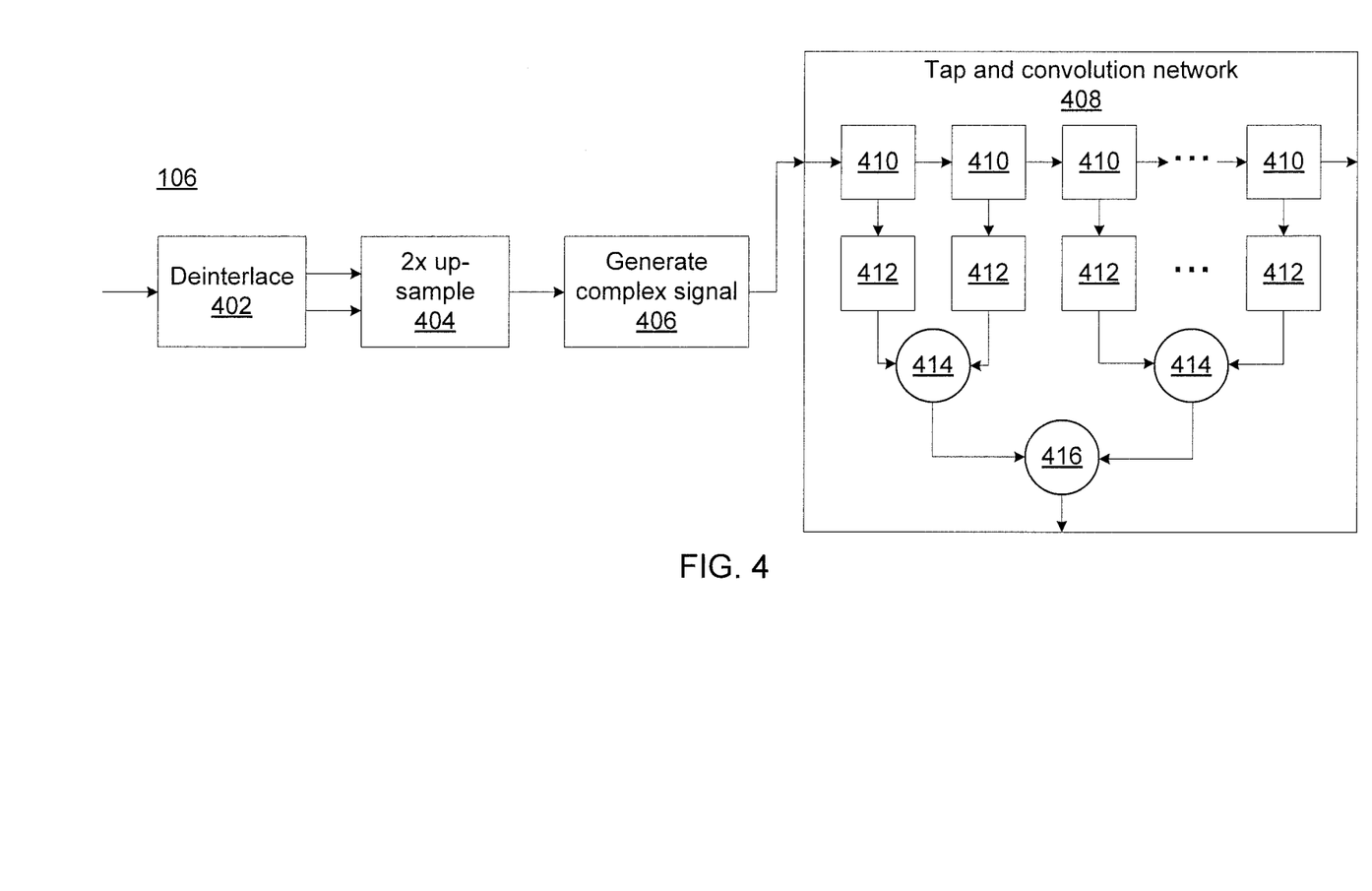
FIG. 4 is a diagram showing an exemplary embodiment of a CD compensation module.

Referring now to FIG. 4, an exemplary embodiment of the CD compensation module 108 is shown. Input data, e.g., binary data represented by the sequence ($b_1$, $b_2$, $b_3$, ... ), is received at the CD compensation module 108 and is split into two streams by deinterlacer 402, which assigns all odd-indexed elements of the data sequence to one stream and all even-indexed elements to another stream. These two streams represent and in-phase channel and a quadrature channel. The two streams pass to an up-sampler 404 which doubles the sample rate by repeating each element in the sequences. For example, this could produce an in-phase channel having the sequence ($b_1$, $b_1$, $b_3$, $b_3$, ... ).

The up-sampled streams then pass to a complex signal generator, which combines the two streams into a single stream of complex values. A tap and convolution network module 408 uses a series of delay taps and filter coefficients to compensate for CD in the signal. The tap and convolution network 408 includes a delay chain of delay taps 410, each of which is connected to a convolution module 412. The convolution modules 412 convolve the received signal with a set of filter coefficients. The outputs of convolution modules 412 are added together across adders 414, and a final adder 416 produces an output signal for the CD compensation module 108. Whereas conventional DSP uses complex multiplication in the convolution operation, the present principles employ sign operations and complex adding operations to reduce computational complexity, as shown below.

Figure 5:
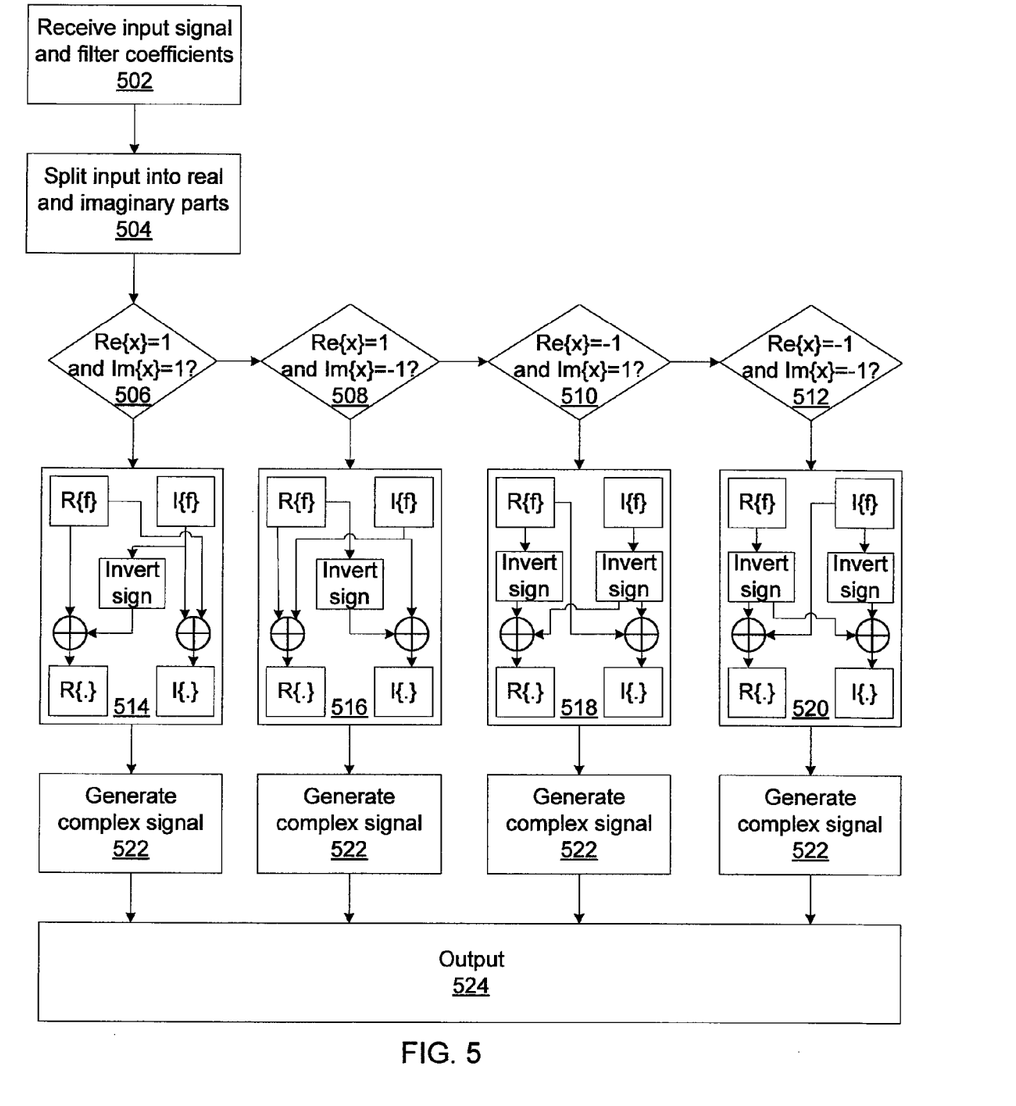
FIG. 5 is a block/flow diagram showing an exemplary method/system for implementing a convolution module.

Referring now to FIG. 5, an embodiment of an exemplary method/system for implementing a convolution module 412 is shown. Input signals x and filter coefficients f are received at block 502. Block 504 splits the input into real part Re{x} an imaginary part Im{x}. A series of decision blocks 506 then determines whether the input signal is (1+j) in block 506, (1−j) in block 508, (−1+j) in block 510, or (−1−j) in block 512. When one of the decision blocks confirms the input signal, it proceeds to its respective sign/adding block 514, 516, 518, or 520. Each sign/adding block finds the real and imaginary parts of the filter coefficient, Re{f} and Im{f} respectively. Block 514 inverts the sign of the imaginary component and adds it to the real component, taking the real portion of the sum. Block 514 also directly adds the real and imaginary components and takes the imaginary component of that sum. Block 516 inverts the sign of the real component and adds it to the imaginary component, taking the imaginary portion of the sum. Block 516 also directly adds the real and imaginary components and takes the real component of that sum. Block 518 inverts the sign of the imaginary component and adds it to the real component, taking the imaginary portion of the sum. Block 518 also adds the sign-inverted real and imaginary components together and takes the real component of that sum. Block 520 inverts the sign of the real component and adds it to the imaginary component, taking the real portion of the sum. Block 520 also adds the sign-inverted real and imaginary components together and takes the imaginary component of that sum.

Whichever sign/adding block is used, 514, 516, 518, or 520, it passes its real and imaginary outputs to a block 522 which generates a complex signal from the components. The complex signal is then output at block 524 to be used for CD compensation as shown in FIG. 4 above. By using sign and add operations instead of multiplication, computing resources can be reduced while maintaining a given throughput.

Figure 6:
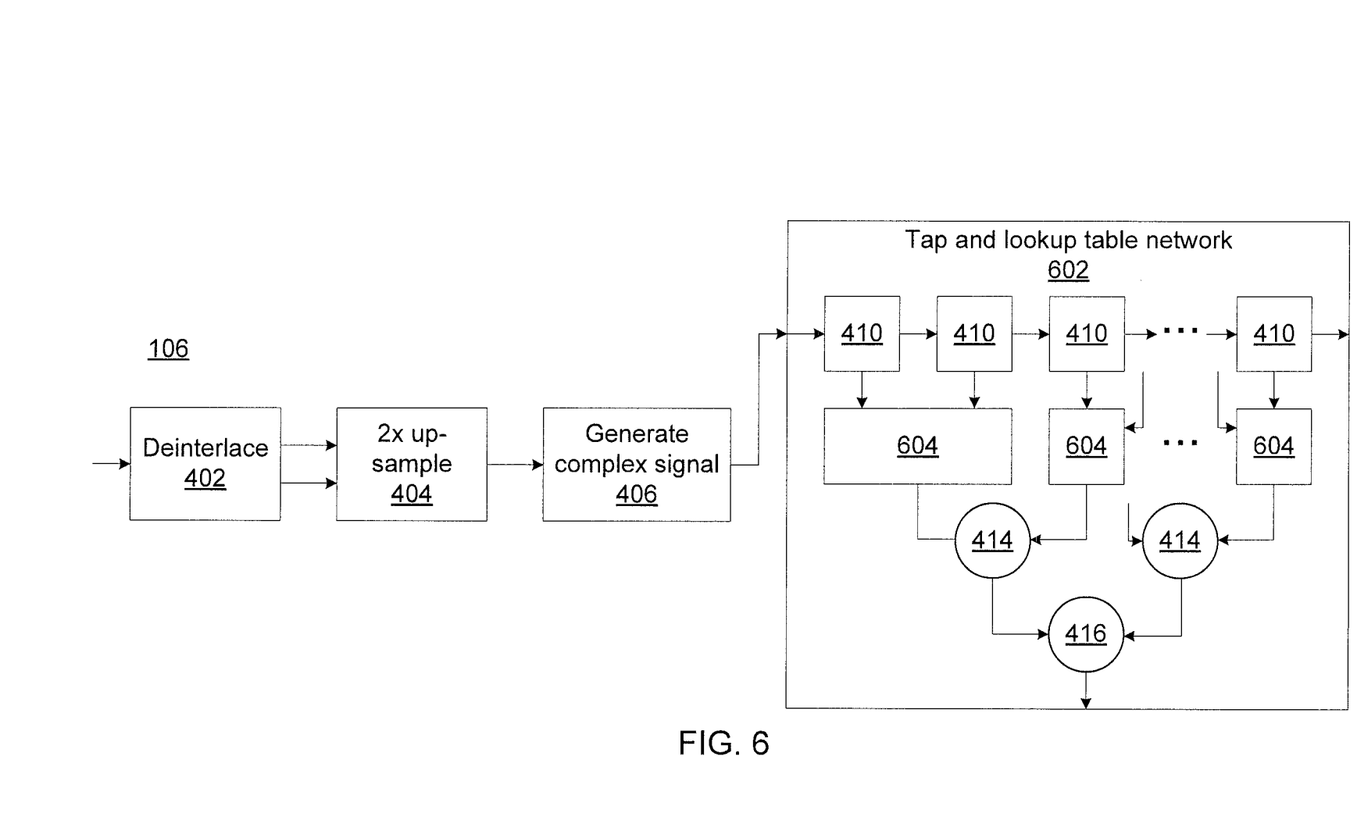
FIG. 6 is a diagram showing an exemplary embodiment of a CD compensation module using lookup tables.

Referring now to FIG. 6, an exemplary embodiment of the CD compensation module 108 using lookup tables is shown. Because the input signals are generated by two sequences of binary data, the number of possible combinations is $2^2=4$ for an exemplary quadrature phase shift keyed (QPSK) modulation format. This is a suitable search depth for a lookup table. Based on the same concept, the search depth can be increased so that the number of adders used for the whole filter 408 can be reduced. As above, the input signal passes through deinterlacer 402 to split the input signal into in-phase and quadrature components before up-sampling 404 and generating a complex signal 406. The complex signal then passes to tap and lookup table network 602. The up-sampled complex signal is separated into multiple groups feeding into lookup tables 604 along the delay chain 410, each group having access to L bits (where L is 2 for the case of QPSK). However, for different modulation schemes, additional numbers of delay taps 410 could feed into a single lookup table 604. The L-bit signal symbols are treated as L-bit patterns for a look-up table search. For a filter 602 having K delay taps 410, there are 2K/L lookup tables for the signal pattern search at different locations along the delay chain 410. The lookup tables 604 are generated off-line using a training signal during system initialization—lookup table 604 generation can be accomplished by combining and processing the coefficients from a conventional finite impulse response (FIR) filter. By using lookup tables 604, the sign operation can be omitted and the number of adders in the filter 602 may be reduced. On the other hand, more memory is used to store the lookup tables 604 as compared to using the convolution modules 412 described above.

Figure 7:
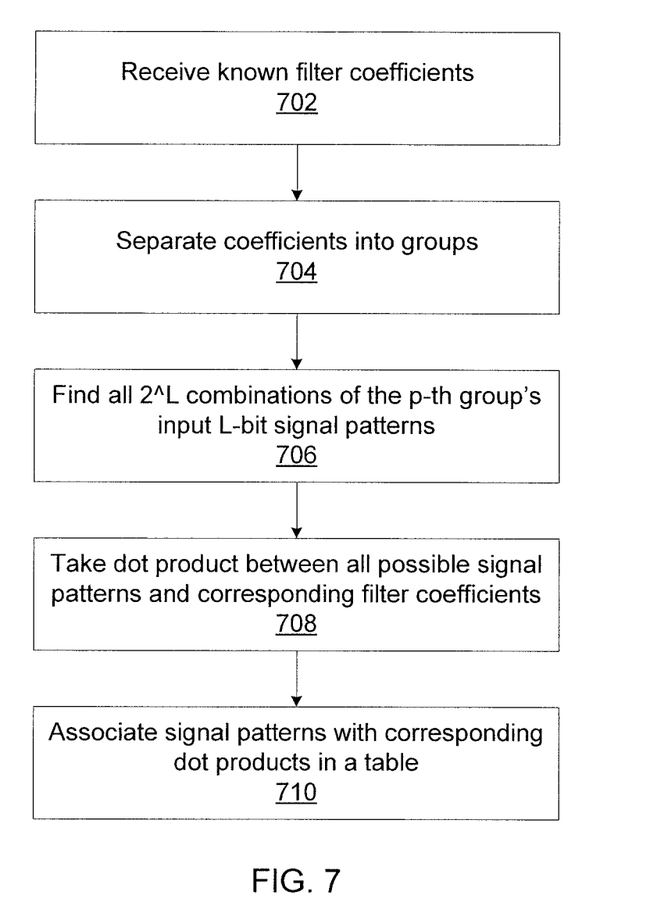
FIG. 7 is a block/flow diagram showing an exemplary embodiment of offline lookup table generation.

Referring now to FIG. 7, an exemplary method for off-line generation of lookup tables 604 is shown. Block 702 collects known filter coefficients. For example, these may be generated by conventional methods suitable for use with conventional FIR filters. The filter coefficients are specific to a particular physical arrangement and may be based on, for example, fiber length, fiber type, span arrangement, or fine-tuning based on training signals. Block 704 separates the K coefficients into 2K/L groups. Block 706 finds all possible signal patterns for each group p, where $1 \leq p \leq 2K/L$. For the $p^{th}$ lookup table 604, the L-bit signal patterns and the corresponding coefficients are multiplied using a dot product at block 706. The resulting dot product values, $(s_I, s_Q)_p$, representing an in-phase value and a quadrature value for the $p^{th}$ group, are associated with the signal patterns in a lookup table 604 by block 710. The signal patterns are saved in the lookup table 604 as search indices or addresses, and the dot products are saved as output signals. An exemplary lookup table 604 is shown below:

TABLE 1

| Input signal pattern | Output signal pattern |
|---|---|
| $(x_1, x_2, \ldots, x_{L/2})_1$ | $(S_I, S_Q)_1$ |
| $(x_1, x_2, \ldots, x_{L/2})_2$ | $(S_I, S_Q)_2$ |
| ... | ... |
| $(x_1, x_2, \ldots, x_{L/2})_{2L}$ | $(S_I, S_Q)_{2L}$ |

In practice, because the input signals are 2× up-sampled by repeating the original data symbols, and because limited clock rates of field programmable gate array or application-specific integrated chip implementations may direct the use of multiple CD compensation modules 108 in parallel in order to reach speeds of 40 Gbit/s or 100 Gbit/s, some further simplifications may be desirable.

Figure 8:
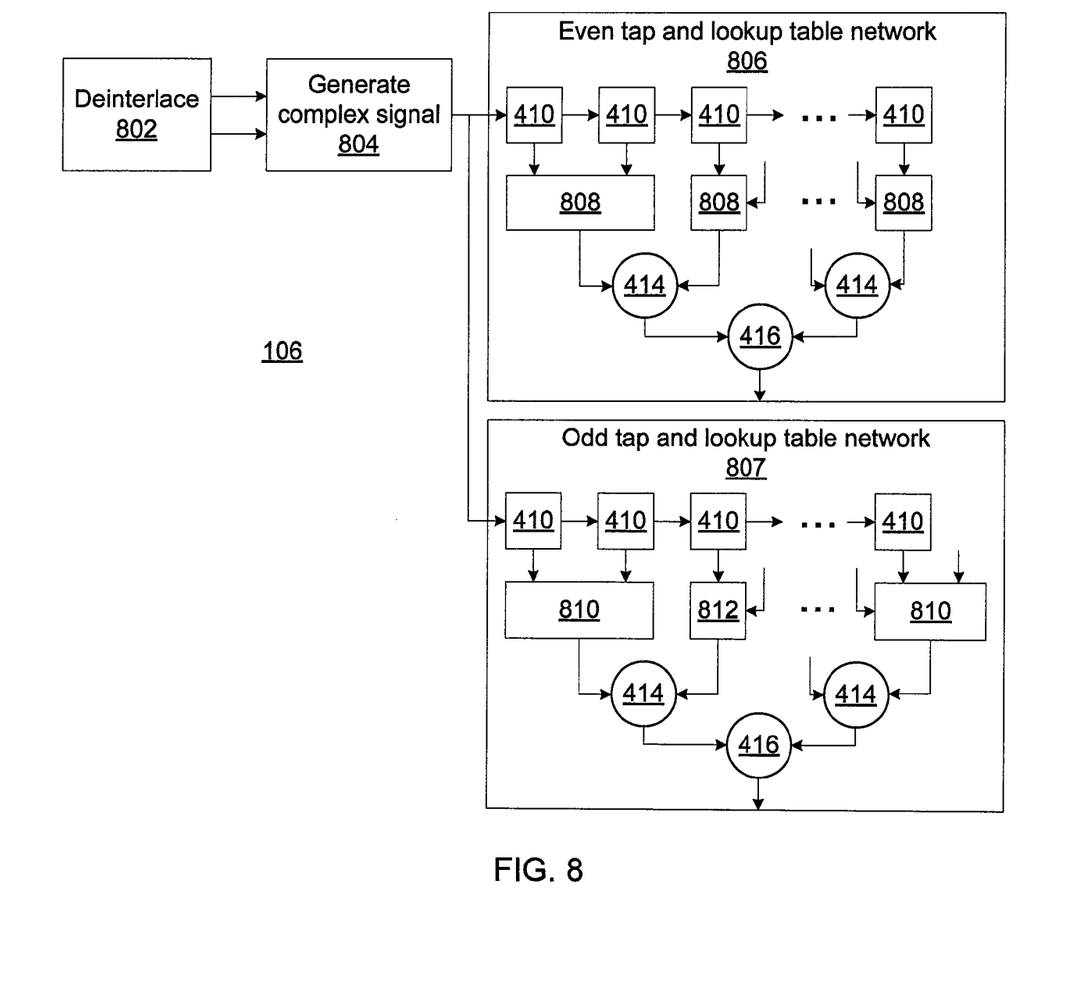
FIG. 8 is a diagram showing an exemplary embodiment of a CD compensation module using odd- and even-path lookup tables.

Referring now to FIG. 8, an exemplary embodiment of a CD compensation module 108 having even and odd paths is shown. As above, the CD compensation module 108 receives an input data signal at its deinterlacer 802. The deinterlacer splits the input data signal into two, representing an in-phase and a quadrature signal. Block 804 then generates a complex signal from the two components and provides that complex signal (without the up-sampling shown in the above embodiments) to tap and lookup table networks 806 and 807. One of the tap and lookup networks 806 represents an "even" path while the other 807 represents an "odd" path. The tap and lookup table networks 806 each have a delay chain 410 split into groups of L bits. For the even network 806, signal symbols are processed as above in FIG. 6, using a lookup table 808.

In the odd network 807, the grouped signal symbols are processed with separate lookup tables 809. In addition, for each group of signal symbols, one extra symbol 812 is processed with sign/add operation 812 as shown above in FIG. 5 using corresponding coefficients. The lookup tables 808 and 809 are generated offline with fine-tuning during initialization using training signals. As compared with the above embodiments, the number of adders used by filters 806 and 807 are reduced, as is the memory used by the lookup tables 808 and 810. Lookup table generation for tables 808 and 810 can be performed by combining and processing the coefficient sets from a conventional FIR filter.

Figure 9:
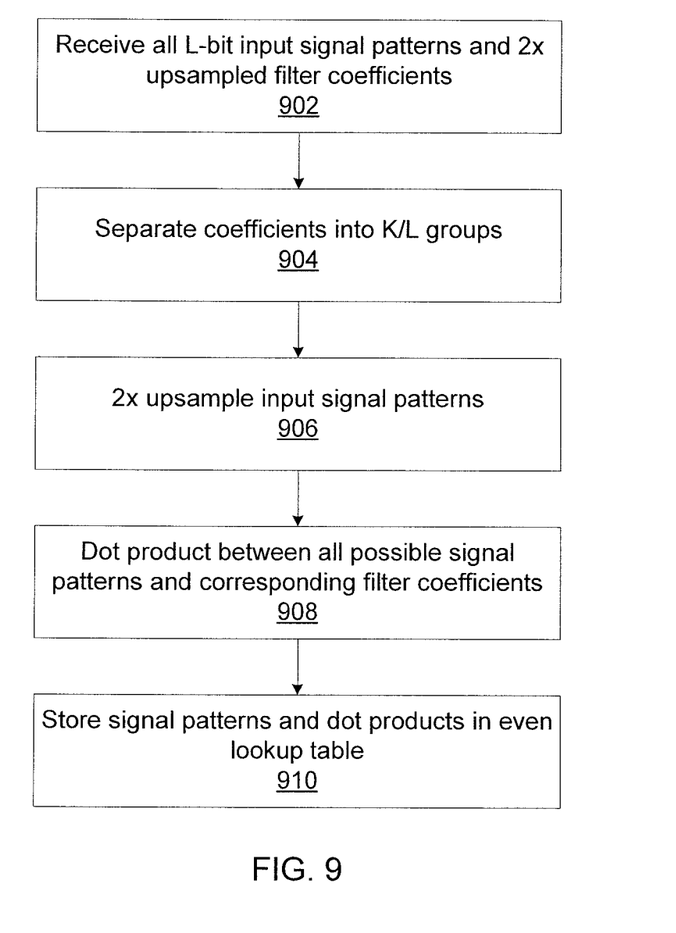
FIG. 9 is a block/flow diagram showing an exemplary embodiment of offling lookup table generation for an even-path lookup table.

Referring now to FIG. 9, a method/system for generating even-path lookup tables 808 is shown. Block 902 receives all L-bit input signal patterns and a set of 2×-upsampled FIR filter coefficients. Block 904 splits the coefficients into K/L groups and block 906 2×-upsamples the input signal patterns by doubling each pattern. Block 908 takes the dot product between the upsampled signal patterns and the filter coefficients corresponding to the patterns. The signal patterns and the dot products are then stored in an even-path lookup table at block 910.

Figure 10:
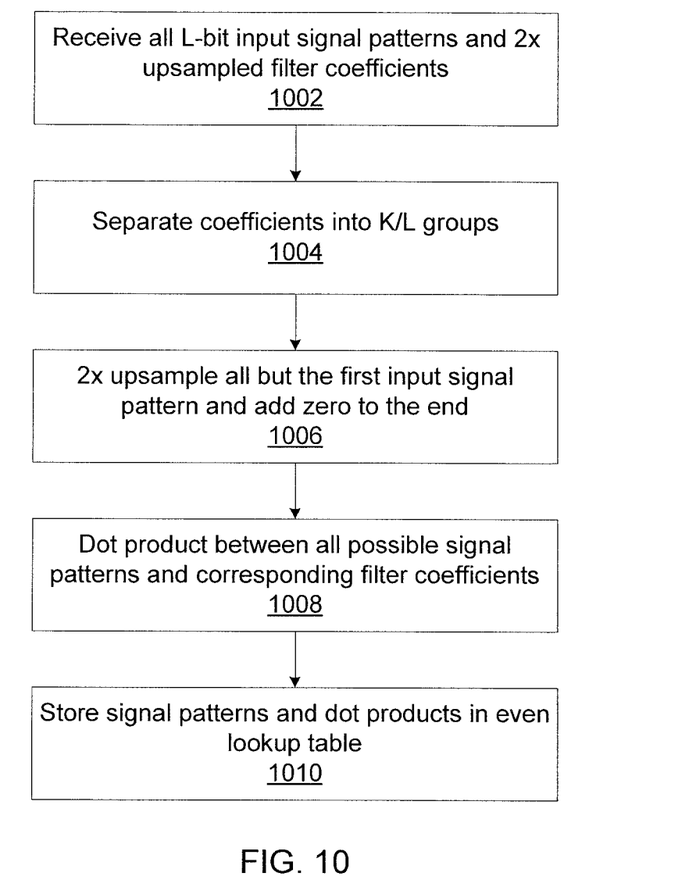
FIG. 10 is a block/flow diagram showing an exemplary embodiment of offling lookup table generation for an odd-path lookup table.

Referring now to FIG. 10, a method/system for generating odd-path lookup tables 810 is shown. As with the even-path lookup tables, block 1002 receives all L-bit input signal patterns and a set of 2× upsampled FIR filter coefficients, while block 1004 splits the coefficients into K/L groups. However, block 1006 upsamples all but the first input signal pattern and adds zero to the end of the sequence in order to produce a sequence of the proper length. Block 1008 then takes the dot product between the signal patterns and the filter coefficients that correspond to each pattern. The signal patterns and the dot products are stored in an odd-path lookup table at block 1010.

Figure 11:
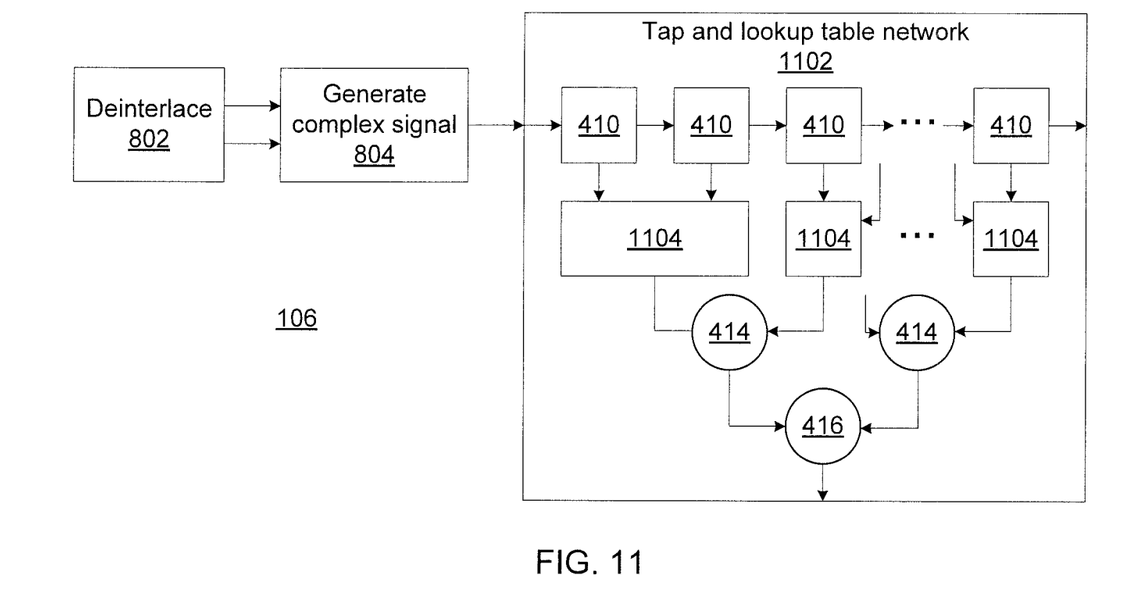
FIG. 11 is a diagram showing an exemplary embodiment of a CD compensation module using non-upsampled signals on a single path.

Referring now to FIG. 11, an exemplary embodiment of a CD compensation module 108 having 1× sampling and a single path. 1× sampling signals can be used for digital transmitters to achieve an output signal with good a Q-factor and eye diagram. This is possible because, for 2× upsampling, the approach is to extend the symbol to another cycle. That is, every two symbols are the same. Here the lookup tables 1104 can simply use 1× sampling rate to reduce the table depth (consider the table depth is $2^W$ where W is the width of memory access address). However, the output is still 2× sampled such that it is twice the width of a single sample.

An input signal is deinterlaced at block 802 to produce an in-phase and a quadrature component. Block 804 then generates a complex signal from the two components and provides the complex signal to tap and lookup table network 1102. The signal passes through a delay chain 410, with the delay modules 410 being grouped as above. The groups of signals pass to lookup tables 1104 using 1× sampling. The results are then combined as above in adders 414 and 416 to produce a CD compensated output signal. The lookup tables 1104 can be generated as shown above in FIG. 7, but instead of separating the coefficients into 2K/L groups, separate the coefficients into K/L groups.

In a reconfigurable optical add/drop multiplexer (ROADM) system, transmission distance may change frequently with implications on the CD compensation filter coefficients. However, because of the size of the lookup tables, the tables may not be easy to generate and update in real-time. However, there are a limited number of ROADMs in any optical network, so the number of possible transmission links is also limited. To solve the changing-distance problem caused by ROADMs, a lookup table library 110 may be used (see FIG. 1). A number of lookup tables are generated prior to use, to cover all possible transmission links in the optical network having ROADMs. When a different transmission link is chosen by a ROADM, a corresponding lookup table may be loaded in the CD compensation module 108 so that the correct CD compensation may be performed for the signal.

Having described preferred embodiments of a system and method for chromatic dispersion compensation using sign operations and lookup tables (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of compensating for chromatic dispersion (CD) comprising:
   receiving an input data signal;
   applying a filter to a data signal, where applying the filter comprises:
      convolving known filter coefficients with a plurality of delayed versions of the data signal using addition and at least one inverse sign operation; and
      adding the convolved delayed versions of the data signal with at least one adder to produce a CD compensated signal; and
   outputting the CD compensated signal;
   wherein said convolving comprises:
   splitting a filter coefficient into its respective real and imaginary parts;
   selectively inverting the sign of said real and imaginary parts; and
   combining the selectively inverted real and imaginary parts to form real and imaginary components of a convolved signal.

2. A chromatic dispersion (CD) compensation device, comprising:
   a delay chain comprising a plurality of delay elements configured to receive and delay an input data signal;
   a plurality of sign/add modules configured to tap a delay element and to convolve a delayed version of the input signal with known filter coefficients using addition and at least one inverse sign operation; and
   a plurality of adders configured to add the convolved delayed versions of the input signal to produce a CD compensated output data signal,
   wherein the plurality of sign/add modules are each configured to split a filter coefficient into its respective real and imaginary parts, selectively invert the sign of said real and imaginary parts, and combine the selectively inverted real and imaginary parts to form real and imaginary components of a convolved signal.

3. The CD compensation device of claim 2, further comprising a 2×-upsampler configured to up-sample the input data signal before it passes to the delay chain.

4. A method of compensating for chromatic dispersion (CD) comprising:
   receiving an input data signal;
   applying a filter to a data signal, where applying the filter comprises:
      grouping delayed versions of the data signal into input symbols;

determining an output signal symbol using a lookup table that stores associations between input symbols and output symbols based on known filter coefficients; and adding the output symbols with at least one adder to produce a CD compensated signal; and outputting the CD compensated signal, wherein the lookup table is generated by finding the dot product between all possible signal patterns for a given symbol and the corresponding filter coefficients.

5. The method of claim 4, further comprising upsampling the data signal by a factor of two before applying the filter.

6. The method of claim 4, wherein applying a filter further comprises splitting the data signal into an even path and an odd path and applying said grouping, determining, and adding for each path.

7. The method of claim 6, wherein the odd path further comprises convolving an additional symbol for each group with a corresponding filter coefficient using addition and at least one inverse sign operation.

8. A chromatic dispersion (CD) compensation device, comprising:

a delay chain comprising a plurality of delay elements configured to receive and delay an input data signal;

a plurality of lookup tables based on known filter coefficients configured to tap a group of delay elements and produce an output symbol;

a plurality of adders configured to add output symbols to produce a CD compensated output data signal, and further comprising an even path and an odd path, wherein each path comprises a separate delay chain, plurality of lookup tables, and plurality of adders.

9. The CD compensation device of claim 8, further comprising a 2×-upsampler configured to up-sample the input data signal before it passes to the delay chain.

10. The CD compensation device of claim 8, wherein the lookup table includes a dot product between all possible signal patterns for a given symbol and the corresponding filter coefficients.

\* \* \* \* \*